US008384725B2

(12) United States Patent
Harada et al.

(10) Patent No.: US 8,384,725 B2
(45) Date of Patent: Feb. 26, 2013

(54) METHOD AND COMPUTER FOR CONTROLLING IMAGE PROCESSOR, AND MACHINE READABLE STORAGE MEDIUM FOR USE IN COMPUTER

(75) Inventors: Hideki Harada, Kakegawa (JP); Yoshihiro Arita, Hamamatsu (JP)

(73) Assignee: Yamaha Corporation (JP)

( * ) Notice: Subject to any disclaimer, the term of this patent is extended or adjusted under 35 U.S.C. 154(b) by 308 days.

(21) Appl. No.: 12/912,279

(22) Filed: Oct. 26, 2010

(65) Prior Publication Data

US 2011/0102445 A1   May 5, 2011

(30) Foreign Application Priority Data

Oct. 30, 2009   (JP) ................................. 2009-250332

(51) Int. Cl.
*G06F 13/00* (2006.01)
*G09G 5/00* (2006.01)

(52) U.S. Cl. ........................................ 345/536; 345/1.1
(58) Field of Classification Search .................. None
See application file for complete search history.

(56) References Cited

U.S. PATENT DOCUMENTS

| 6,195,086 B1* | 2/2001 | Perlman et al. ............... 345/213 |
| 2002/0063675 A1* | 5/2002 | Furuhashi et al. ............. 345/98 |
| 2008/0030615 A1* | 2/2008 | Vasquez et al. ............... 348/446 |

FOREIGN PATENT DOCUMENTS

JP   3630587 B2   3/2005

* cited by examiner

*Primary Examiner* — Xiao M. Wu
*Assistant Examiner* — Mohammad H Akhavannik
(74) *Attorney, Agent, or Firm* — Rossi, Kimms & McDowell LLP

(57) ABSTRACT

A method is provided for controlling an image processor to perform display of an image on a first display device in synchronization with short frames and to perform display of an image on a second display device in synchronization with long frames each of which has a time length longer than a time length of each short frame. According to the method, a synchronization signal acquisition process acquires a first synchronization signal synchronized with switching of the short frames. An estimation process estimates, each time the first synchronization signal is acquired, a generation position of a second synchronization signal synchronized with switching of the long frames within a 2-frame period corresponding to two short frames after the first synchronization signal is acquired. The image processor is provided with a drawing command instructing generation of an image to be displayed on the first display device or the second display device controllably in accordance with results of the estimating by the estimation process.

10 Claims, 5 Drawing Sheets

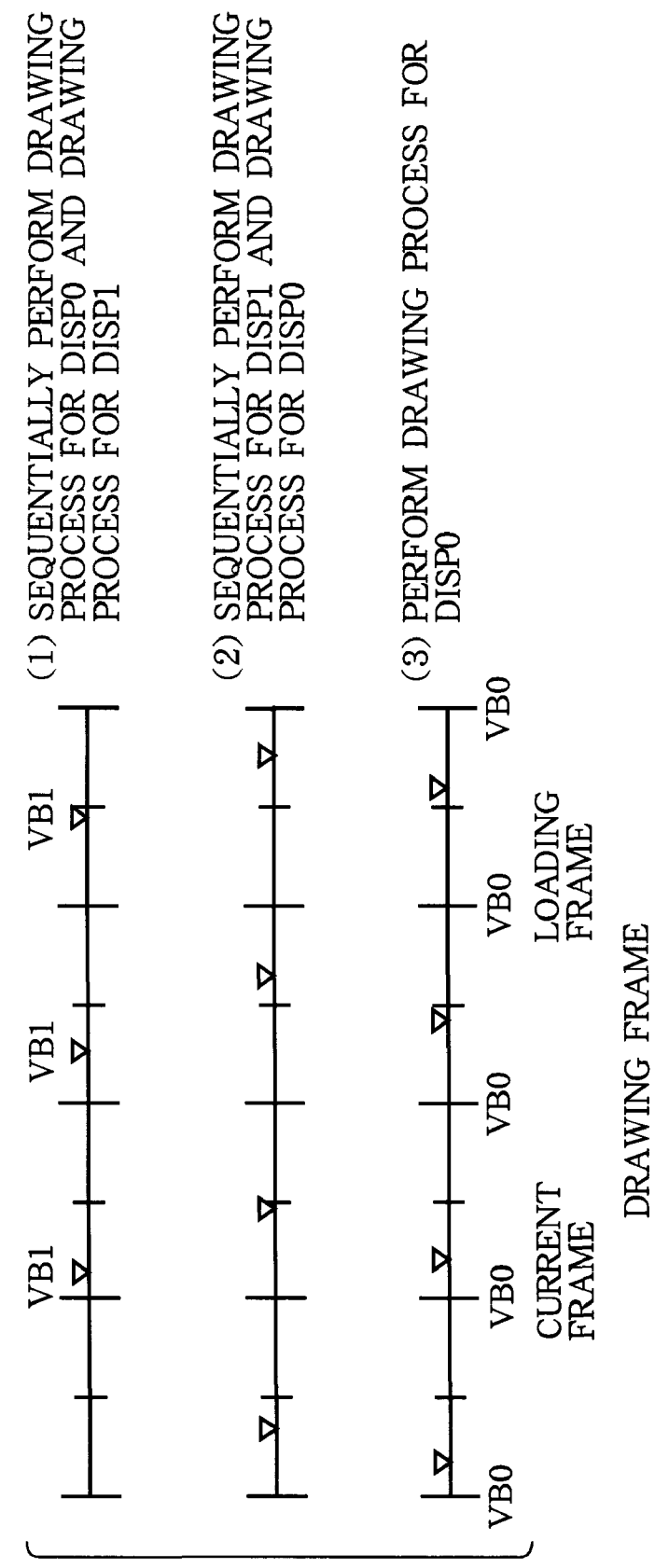

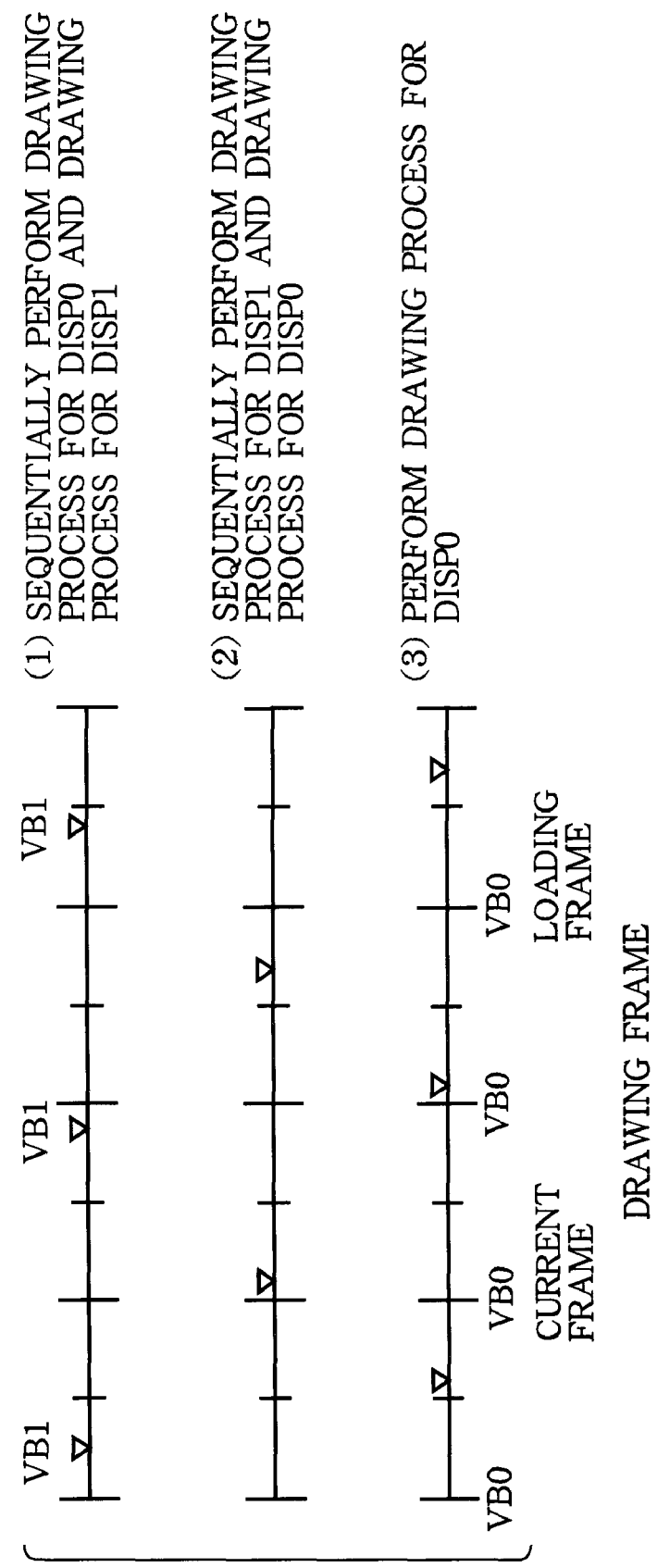

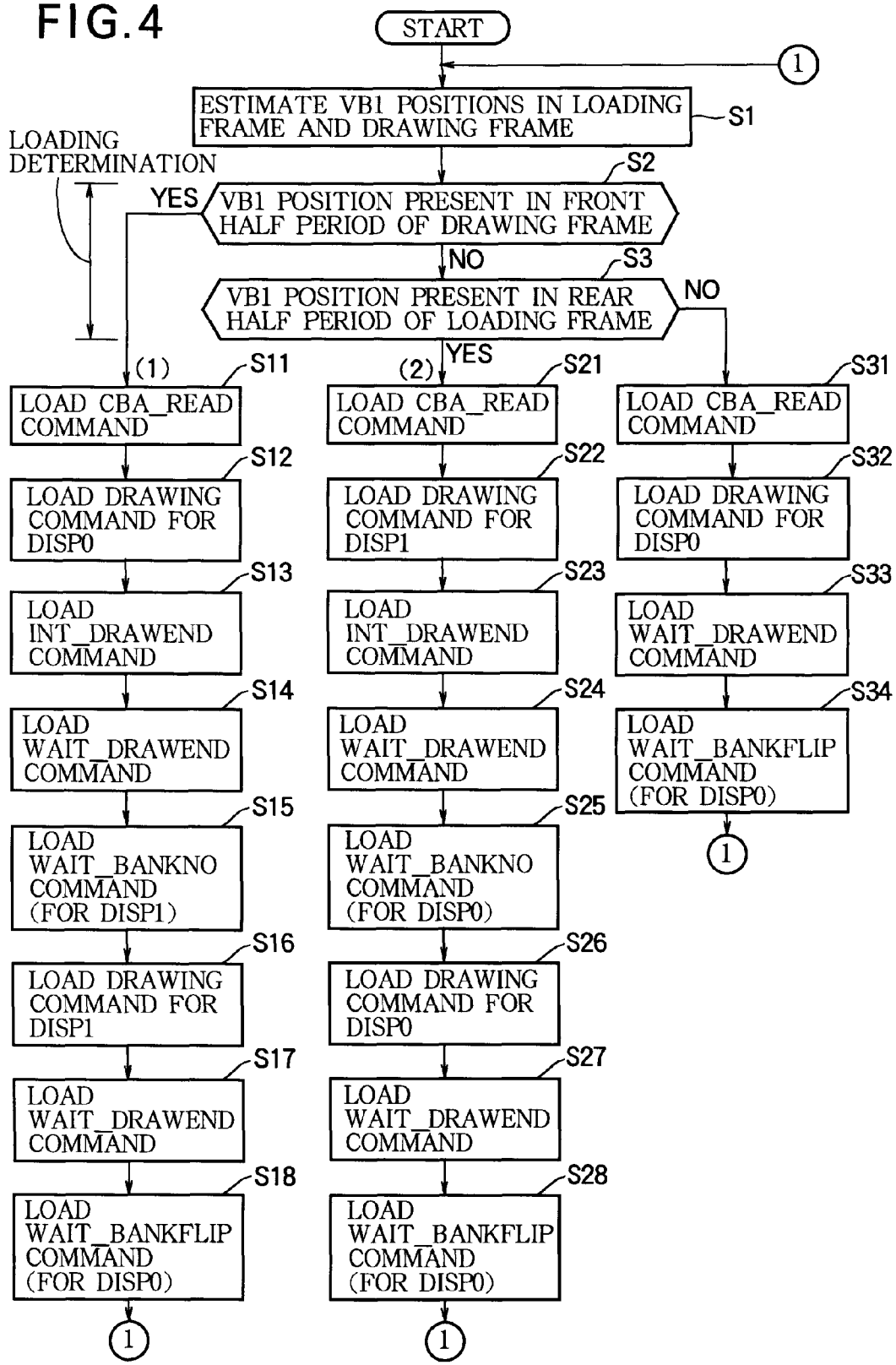

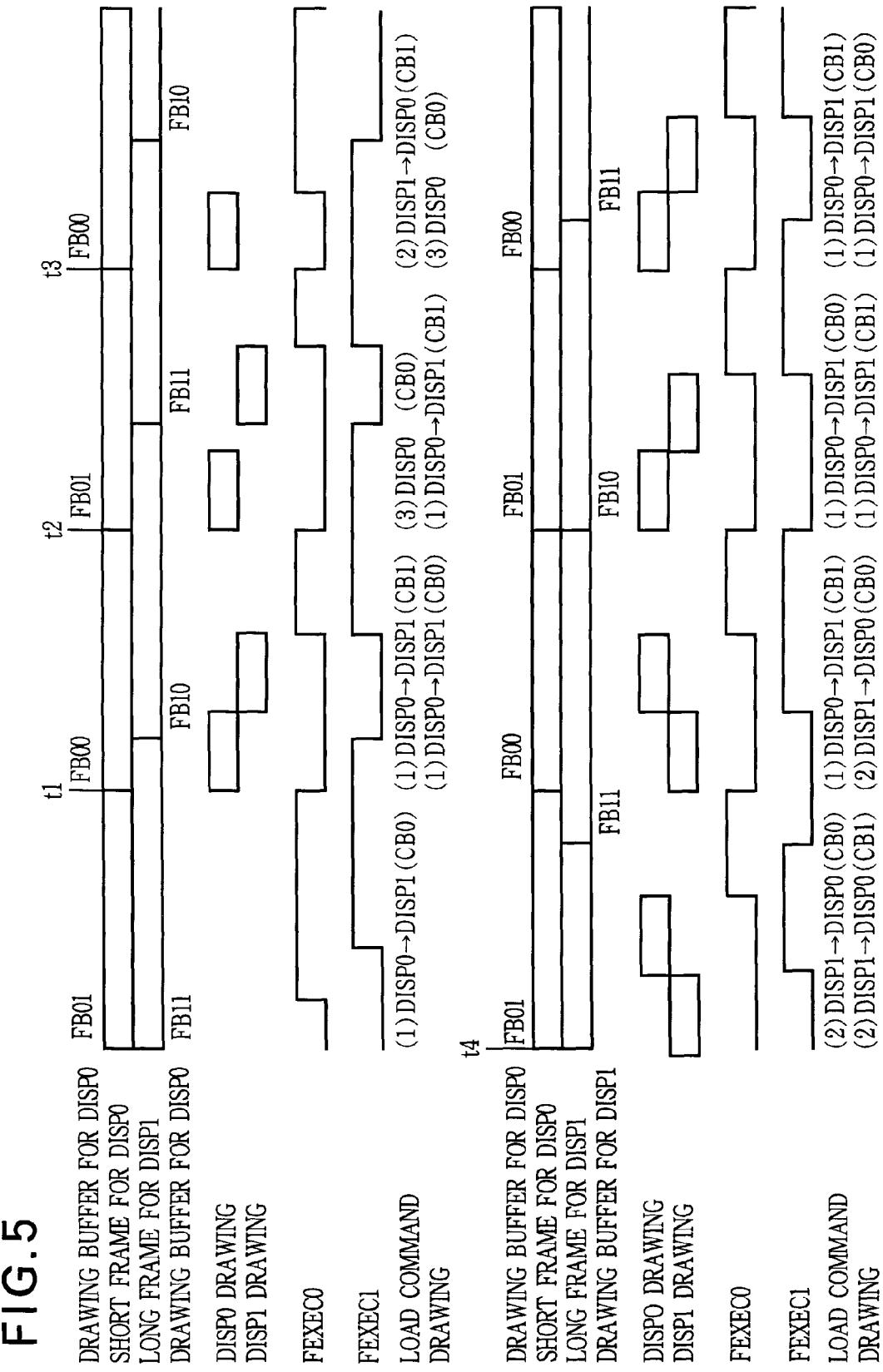

METHOD AND COMPUTER FOR CONTROLLING IMAGE PROCESSOR, AND MACHINE READABLE STORAGE MEDIUM FOR USE IN COMPUTER

BACKGROUND OF THE INVENTION

1. Technical Field of the Invention

The present invention relates to a technology for allowing an image processor provided in an amusement apparatus to display images on a display device, and more particularly to a control method, apparatus and program allowing an image processor to display images on two display devices employing different frame rates.

2. Description of the Related Art

Some personal computers or the like have a dual screen function to allow images to be displayed on two display devices. An amusement apparatus such as a game console having such a dual screen function has been proposed recently.

However, in some cases, an electronic apparatus such as an amusement apparatus requires a function to display moving images on two display devices having different time frame lengths (vertical scanning periods). To meet this requirement, the apparatus may include two image processors that generate image data to be displayed on two display devices and may be constructed to allow the two image processors to operate in parallel. However, such an apparatus including two image processors is expensive. Therefore, for example, an apparatus may be constructed so as to allow one image processor to perform two types of drawing (or rendering) processes for generating image data to be displayed on two display devices using, as a trigger, switching of shorter frames among different-length frames of the two display devices. However, when the frame lengths of the two display devices are different, the phase relationship between frames of the displays changes from moment to moment. Therefore, image data of a screen to be displayed on a display device which operates with long frames may not be generated in time for the start of a frame for displaying the image data of the screen, failing to display the screen and thus causing frame (or screen) dropping or skipping.

SUMMARY OF THE INVENTION

The invention has been made in view of such circumstances and it is an object of the invention to provide a method, program and apparatus for controlling an image processor which allows the image processor to display moving images on two display devices having different frame lengths without causing frame dropping.

The invention provides a method for controlling an image processor to perform display of an image on a first display device in synchronization with first frames and to perform display of an image on a second display device in synchronization with second frames each of which has a time length longer than a time length of each first frame, the method comprising: a synchronization signal acquisition process of acquiring a first synchronization signal synchronized with switching of the first frames; and an estimation process of estimating, each time the first synchronization signal is acquired, a generation position of a second synchronization signal synchronized with switching of the second frames within a 2-frame period corresponding to two first frames after the first synchronization signal is acquired, wherein the image processor is provided with a drawing command instructing generation of an image to be displayed on the first display device or the second display device controllably in accordance with results of the estimating by the estimation process.

In a preferred form, the image processor is provided with the drawing command in accordance with the estimated generation position of the second synchronization signal within the 2-frame period.

In a practical form, a reference point is set in each of earlier one and later one of the two first frames in the 2-frame period so as to divide each of the earlier first frame and the later first frame into a front sub period and a rear sub period, the method further comprising a command loading process including: performing first determination as to whether or not the estimated generation position of the second synchronization signal falls in the front sub period of the later first frame, and sequentially providing a preceding drawing command instructing generation of an image to be displayed on the first display device and a succeeding drawing command instructing generation of an image to be displayed on the second display device to the image processor when the first determination is affirmative; performing second determination as to whether or not the estimated generation position of the second synchronization signal falls in the rear sub period of the earlier first frame when the first determination is not affirmative, and sequentially providing a preceding drawing command instructing generation of an image to be displayed on the second display device and a succeeding drawing command instructing generation of an image to be displayed on the first display device to the image processor when the second determination is affirmative; and providing a sole drawing command instructing generation of the image to be displayed on the first display device to the image processor when the first determination is not affirmative and the second determination is not affirmative.

Preferably, the image processor further comprises: a first frame buffer and a second frame buffer, each storing an image to be displayed on the first display device, wherein one of the first and second frame buffers is in a display state in which data of the image is provided from the frame buffer to the first display device while the other is in a drawing state in which data of the image is written to the frame buffer and the first and second frame buffers perform bank flip to switch one of the first and second frame buffers from a drawing state to a display state and to switch the other from a display state to a drawing state in synchronization with each first frame; and a third frame buffer and a fourth frame buffer, each storing an image to be displayed on the second display device, wherein one of the third and fourth frame buffers is in a display state in which data of the image is provided from the frame buffer to the second display device while the other is in a drawing state in which data of the image is written to the frame buffer and the third and fourth frame buffers perform bank flip to switch one of the third and fourth frame buffers from a drawing state to a display state and to switch the other from a display state to a drawing state in synchronization with each second frame, and wherein the command loading process includes: providing, when the first determination is affirmative, the image processor with a command sequence including a bank flip wait command instructing the image processor to await execution of a subsequent command until bank flip between the third and fourth frame buffers is generated, the bank flip wait command being inserted between the preceding drawing command instructing generation of an image to be displayed on the first display device and the succeeding drawing command instructing generation of an image to be displayed on the second display device; and providing, when the first determination is not affirmative and the second determination is affirmative, the image processor with a command sequence including a bank flip wait command instructing the image processor to await execution of a subsequent command until bank flip between the first and second frame buffers is generated, the bank flip wait command being inserted between the preceding drawing command instructing generation of an image to be displayed on the second display device and the succeeding drawing command instructing generation of an image to be displayed on the first display device.

Preferably, the reference point is set such that a ratio of the front sub period to the rear sub period corresponds to a ratio of a time required for generation of an image to be displayed on the first display device to a time required for generation of an image to be displayed on the second display device.

The invention further encompasses a machine readable storage medium for use in a computer, the medium containing a program executable by the computer to perform a method for controlling an image processor to perform display of an image on a first display device in synchronization with first frames and to perform display of an image on a second display device in synchronization with second frames each of which has a time length longer than a time length of each first frame, wherein the method comprises: a synchronization signal acquisition process of acquiring a first synchronization signal synchronized with switching of the first frames; and an estimation process of estimating, each time the first synchronization signal is acquired, a generation position of a second synchronization signal synchronized with switching of the second frames within a 2-frame period corresponding to two first frames after the first synchronization signal is acquired, wherein the method provides the image processor with a drawing command instructing generation of an image to be displayed on the first display device or the second display device controllably in accordance with results of the estimating by the estimation process.

The invention further encompasses a computer connected to an image processor that performs display of an image on a first display device in synchronization with first frames and performs display of an image on a second display device in synchronization with second frames each of which has a time length longer than a time length of each first frame, the computer controlling the image processor to ensure parallel displaying of the images on the first display device and the second display device, the computer comprising: a synchronization signal acquisition module of acquiring a first synchronization signal synchronized with switching of the first frames; and an estimation module of estimating, each time the first synchronization signal is acquired, a generation position of a second synchronization signal synchronized with switching of the second frames within a 2-frame period corresponding to two first frames after the first synchronization signal is acquired, wherein the computer provides the image processor with a drawing command instructing generation of an image to be displayed on the first display device or the second display device controllably in accordance with results of the estimating by the estimation module.

BRIEF DESCRIPTION OF THE DRAWINGS

FIG. 2 illustrates a method for controlling an image processor that a host CPU performs in the amusement apparatus.

FIG. 3 illustrates another method for controlling the image processor that the host CPU performs in the amusement apparatus.

FIG. 4 is a flow chart illustrating processes of a control program executed by the host CPU.

FIG. 5 is a timing chart illustrating an example of control of the image processor performed in this embodiment.

DETAILED DESCRIPTION OF THE INVENTION

Figure 1:
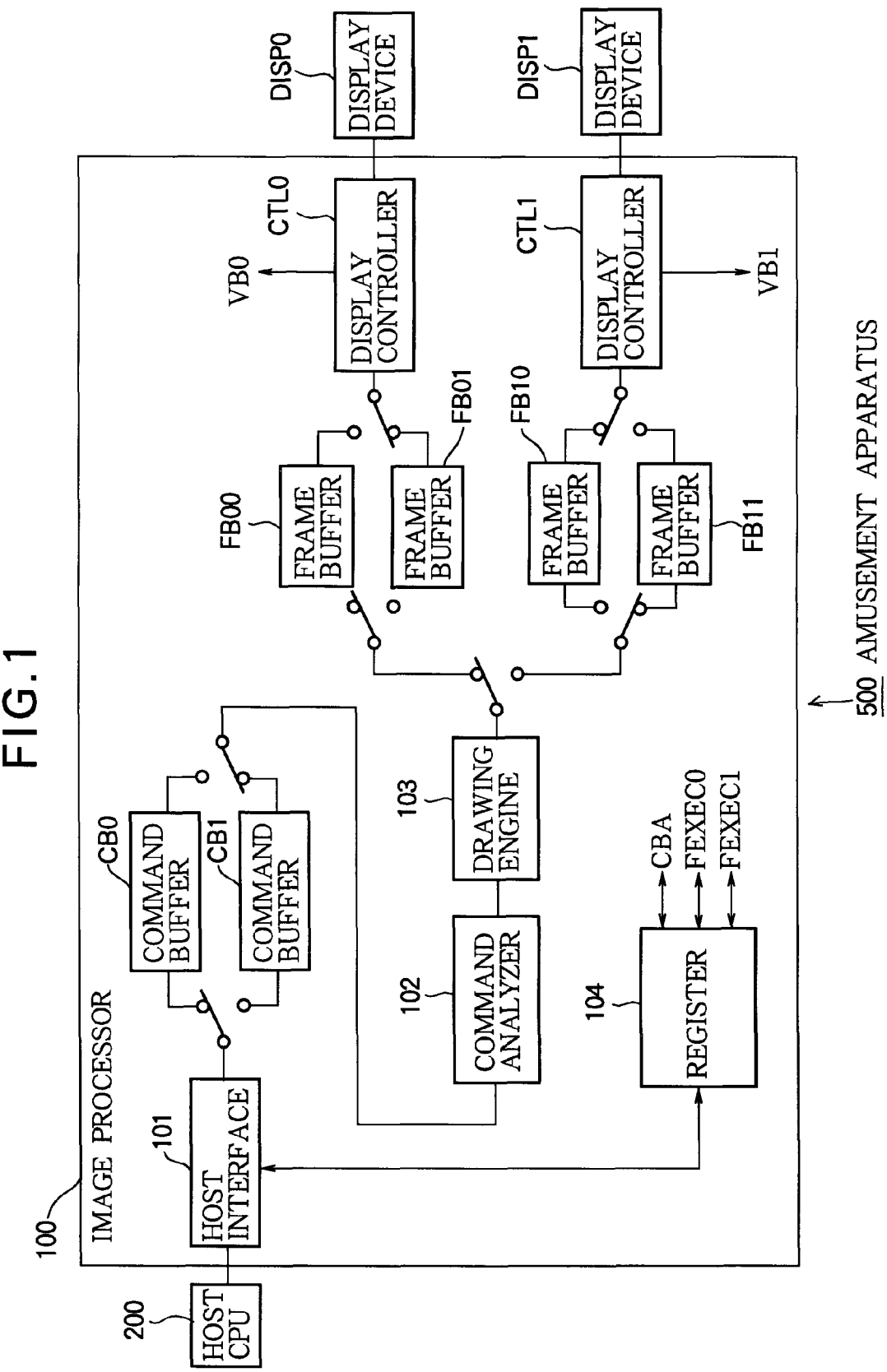
FIG. 1 is a block diagram illustrating a configuration of an amusement apparatus to which a control method according to an embodiment of the invention is applied.

Embodiments of the invention will now be described with reference to the drawings.

FIG. 1 is a block diagram illustrating a configuration of an amusement apparatus 500 to which a control method according to an embodiment of the invention is applied. As shown in FIG. 1, the amusement apparatus 500 includes an image processor 100, two display devices DISP0 and DISP1, each including a Liquid Crystal Display (LCD), and a host CPU 200 which controls the overall operation of the amusement apparatus 500.

The image processor 100 is a processor that performs image display on each of the display devices DISP0 and DISP1 according to an instruction from the host CPU 200. In the image processor 100, a host interface 101 receives a variety of commands, data, and control information from the host CPU 200 and provides the same to each associated component in the image processor 100. A register 104 stores control information used to control each component of the image processor 100. The host CPU 200 may write desired control information to the register 104 or read desired control information stored in the register 104 through the host interface 101. Part of the control information stored in the register 104 may be rewritten by the components included in the image processor 100. Details of the control information in the register 104 will be described below as needed.

Each of command buffers CB0 and CB1 is a buffer that temporarily stores a command provided from the host CPU 200 through the host interface 101. One of the command buffers CB0 and CB1 is used as a write buffer when the other is used as a read buffer. A command provided from the host CPU 200 is written to a command write buffer among the command buffers CB0 and CB1. A command is read from a command read buffer among the command buffers CB0 and CB1 and is then provided to a command analyzer 102. A write buffer and a read buffer among the command buffers CB0 and CB1 are determined based on the value of a command buffer flag CBA in the register 104. Specifically, the command buffer CB0 is a write buffer and the command buffer CB1 is a read buffer when the command buffer flag CBA is "0", and the command buffer CB1 is a write buffer and the command buffer CB0 is a read buffer when the command buffer flag CBA is "1".

The command analyzer 102 is a device that analyzes a command provided from the command read buffer and controls the operation of each component such as a drawing engine (or rendering engine) 103. The drawing engine 103 is a device that generates image data to be displayed on the display devices DISP0 and DISP1 under control of the command analyzer 102.

Each of frame buffers FB00 and FB01 is a buffer that stores image data of one frame (i.e., one screen) to be displayed on the display device DISP0. Here, switching control is performed on the frame buffers FB00 and FB01 such that one of the frame buffers FB00 and FB01 is switched to a drawing buffer while the other is switched to a display buffer. When the drawing engine 103 generates image data to be displayed on the display device DISP0, the image data is written to a drawing buffer among the frame buffers FB00 and FB01. The register 104 stores a bank flip enable flag FEXEC0 for switching control of the frame buffers FB00 and FB01. When frames (vertical scan periods) of the display device DISP0 are switched with the bank flip enable flag FEXEC0 set to "1", bank flip is performed to switch one of the frame buffers FB00 and FB01 which has been a drawing buffer until that time to a display buffer and to switch the other of the frame buffers FB00 and FB01 which has been a display buffer to a drawing buffer. When this bank flip has been performed, the bank flip enable flag FEXEC0 in the register 104 is set to "0".

Each of frame buffers FB10 and FB11 is a buffer that stores image data of one frame (i.e., one screen) to be displayed on the display device DISP1. Here, switching control is performed on the frame buffers FB10 and FB11 such that one of the frame buffers FB10 and FB11 is switched to a drawing buffer while the other is switched to a display buffer. When the drawing engine 103 generates image data to be displayed on the display device DISP1, the image data is written to a drawing buffer among the frame buffers FB10 and FB11. The register 104 stores a bank flip enable flag FEXEC1 for switching control of the frame buffers FB10 and FB11. When frames of the display device DISP1 are switched with the bank flip enable flag FEXEC1 set to "1", bank flip is performed to switch one of the frame buffers FB10 and FB11 which has been a drawing buffer until that time to a display buffer and to switch the other of the frame buffers FB10 and FB11 which has been a display buffer to a drawing buffer. When this bank flip has been performed, the bank flip enable flag FEXEC1 in the register 104 is set to "0".

The host CPU 200 can rewrite each of the bank flip enable flags FEXEC0 and FEXEC1 in the register 104 through the host interface 101.

A display controller CTL0 provides synchronization signals for display timing control such as a vertical synchronization signal and a horizontal synchronization signal to the display device DISP0. The display controller CTL0 also reads image data of one screen from a display buffer among the frame buffers FB00 and FB01 and provides the read image data to the display device DISP0 in each frame (i.e., in each vertical scan period of the display device DISP0).

A display controller CTL1 provides synchronization signals for display timing control such as a vertical synchronization signal and a horizontal synchronization signal to the display device DISP1. The display controller CTL1 also reads image data of one screen from a display buffer among the frame buffers FB10 and FB11 and provides the read image data to the display device DISP1 in each frame (i.e., in each vertical scan period of the display device DISP1).

In this embodiment, the display controller CTL0 provides a vertical blanking signal VB0 that is synchronized with switching of frames of the display device DISP0 to the host CPU 200 through the host interface 101. The display controller CTL1 provides a vertical blanking signal VB1 that is in synchronization with switching of frames of the display device DISP1 to the host CPU 200 through the host interface 101. The display devices DISP0 and DISP1 may have the same resolution and may also have different resolutions.

The configuration of the image processor 100 has been described above. This embodiment is characterized by an image processor control method that the host CPU 200 performs when the image processor 100 performs image display on the display devices DISP0 and DISP1 at different frame rates. The following is a more detailed description. First, in this embodiment, the display device DISP0 repeats image display in a given frame (i.e., in a given vertical scan period) and the display device DISP1 repeats image display in a given frame (i.e., in a given vertical scan period) longer than that of the display device DISP0. In the following description, the frame (vertical scan period) of the display device DISP0 is referred to as a "short frame" and the frame (vertical scan period) of the display device DISP1 is referred to as a "long frame" for ease of explanation. Here, for example, to display a moving image including N1 screens on the display device DISP0 and to display a moving image including N2 screens on the display device DISP1 in parallel, the image processor 100 should perform a drawing process, in which image data of each of the N1 screens to be displayed on the display device DISP0 is written to a drawing buffer, so that the drawing process is performed in time for display of a short frame, and also perform a drawing process, in which image data of each of the N2 screens to be displayed on the display device DISP1 is written to a drawing buffer, so that the drawing process is performed in time for display of a long frame in parallel. This embodiment is characterized by a method for providing the image processor 100 with commands allowing each drawing process to be activated at an appropriate time so that each drawing process for generating image data to be displayed on the display device DISP0 and each drawing process for generating image data to be displayed on the display device DISP1 are reliably performed without failure.

A method for controlling the image processor 100 that the host CPU 200 performs according to this embodiment is described below with reference to FIGS. 2 and 3. In FIGS. 2 and 3, positions of generation of a vertical blanking signal VB0 synchronized with a short frame are denoted by tall graduation marks on three horizontal time axes, and positions of generation of a vertical blanking signal VB1 synchronized with a long frame are shown by ∇ marks. In FIGS. 2 and 3, reference points, each of which divides a short frame into a front half period and a rear half period, are denoted by short graduation marks. In this example, it is assumed that the sum of a time required to perform a drawing process for generating image data to be displayed on the display device DISP0 and a time required to perform a drawing process for generating image data to be displayed on the display device DISP1 is less than the time length of one short frame and the two required times are equal. Therefore, the reference points are at the centers of short frames.

In this embodiment, in the case where the host CPU 200 performs image display of a short frame on the display device DISP0 while performing image display of a long frame on the display device DISP1, the host CPU 200 determines, each time a vertical blanking signal VB0 is generated, that the period of one short frame which starts at the vertical blanking signal VB0 is a current frame, that the period of one short frame immediately after the current frame is a loading frame (earlier frame), and that the period of one short frame immediately after the loading frame is a drawing frame (later frame), and estimates a generation position of a vertical blanking signal VB1 in each of the drawing and loading frames according to a stored control program.

For example, the host CPU 200 may perform such estimation in the following manner. Each time a vertical blanking signal VB0 is generated, the host CPU 200 calculates a ratio R (=T1/T0) between the time length T0 of a short frame and the time length T1 of a long frame and determines that a fractional portion of the calculated ratio is an estimated generation position of a vertical blanking signal VB1 in the current frame, that a fractional portion of the sum of the estimated generation position of the vertical blanking signal VB1 and the ratio R is an estimated generation position of a vertical blanking signal VB1 in the loading frame, and that a fractional portion of the sum of the estimated generation position of the vertical blanking signal VB1 in the loading frame and the ratio R is an estimated generation position of a vertical blanking signal VB1 in the drawing frame.

The host CPU 200 then determines a drawing process which the host CPU 200 allows the image processor 100 to perform in the drawing frame based on the estimated results of the generation position of the vertical blanking signal VB1 according to the control program, and provides a command to execute the drawing process to the image processor 100 in the loading frame according to the following procedure.

(1) The host CPU 200 performs first determination as to whether or not an estimated generation position of a vertical blanking signal VB1 falls in the front half period of the drawing frame. When the first determination result is affirmative, the host CPU 200 generates a sequence of commands allowing the image processor 100 to perform a drawing process for generating image data to be displayed on the display device DISP0 precedingly and then to perform a drawing process for generating image data to be displayed on the display device DISP1 succeedingly and writes the generated command sequence to the command write buffer in the image processor 100 in the loading frame (see top-axis portions of FIGS. 2 and 3).

Here, the host CPU 200 allows the image processor 100 to first perform the drawing process for generating image data to be displayed on the display device DISP0 because of the following reasons. First, in this example, the sum of a time required to perform a drawing process for generating image data to be displayed on the display device DISP0 and a time required to perform a drawing process for generating image data to be displayed on the display device DISP1 is less than the time length of one short frame and the two required times are equal. Accordingly, if a drawing process for generating image data to be displayed on the display device DISP1 is initiated not later than the start point of the rear half period of the drawing frame in the case where the vertical blanking signal VB1 is in the front half period of the drawing frame, it is possible to complete the drawing process until the drawing frame is terminated and to write all image data generated through the drawing process to a frame buffer that is set as a drawing buffer for the display device DISP1 in the period of one long frame that starts from the vertical blanking signal VB1. On the other hand, if a drawing process for generating image data to be displayed on the display device DISP0 is initiated at the start point of the drawing frame, it is possible to complete the drawing process within the front half period of the drawing frame and to write all image data generated through the drawing process to the drawing buffer for the display device DISP0 in the drawing frame. These are the reasons why the host CPU 200 allows the image processor 100 to first perform the drawing process for generating image data to be displayed on the display device DISP0 and then perform the drawing process for generating image data to be displayed on the display device DISP1.

(2) When the first determination result is not affirmative, the host CPU 200 performs second determination as to whether or not an estimated generation position of a vertical blanking signal VB1 is present in the rear half period of the loading frame. When the second determination result is affirmative, the host CPU 200 generates a sequence of commands allowing the image processor 100 to perform a drawing process for generating image data to be displayed on the display device DISP1 precedingly and then to perform a drawing process for generating image data to be displayed on the display device DISP0 succeedingly, and writes the generated command sequence to the command write buffer in the image processor 100 in the loading frame (see middle-axis portions of FIGS. 2 and 3).

Here, the host CPU 200 allows the image processor 100 to first perform the drawing process for generating image data to be displayed on the display device DISP1 for the following reasons. First, the cases where the first determination result is negative and the second determination result is affirmative include the case where an estimated generation position of a vertical blanking signal VB1 falls in the rear half period of the drawing frame and an estimated generation position of a previous vertical blanking signal VB1 falls in the rear half period of the loading frame as shown in a middle-axis portion of FIG. 2, and the case where an estimated generation position of a vertical blanking signal VB1 is not present in the drawing frame and an estimated generation position of a preceding vertical blanking signal VB1 is present in the rear half period of the loading frame as shown in a middle-axis portion of FIG. 3. In both the former case (shown in the middle-axis portion of FIG. 2) and the latter case (shown in the middle-axis portion of FIG. 3), the front half period of the drawing frame is included in the period of one long frame that starts from the position of the vertical blanking signal VB1 in the rear half period of the loading frame. Accordingly, if a drawing process for generating image data to be displayed on the display device DISP1 is initiated at the start point of the drawing frame, it is possible to complete the drawing process until the front half period of the drawing frame is terminated and to write all image data generated through the drawing process to a frame buffer that is set as a drawing buffer for the display device DISP1 in the period of one long frame that starts at a vertical blanking signal VB1 in the rear half period of the loading frame. On the other hand, if a drawing process for generating image data to be displayed on the display device DISP0 is initiated not later than initiation of the rear half period of the drawing frame, it is possible to complete the drawing process until the drawing frame is terminated and to write all image data generated through the drawing process to the drawing buffer for the display device DISP0 in the drawing frame. These are the reasons why the host CPU 200 allows the image processor 100 to first perform the drawing process for generating image data to be displayed on the display device DISP1 and then perform the drawing process for generating image data to be displayed on the display device DISP0.

(3) When both the first and second determination results are negative, the host CPU 200 generates a sequence of commands allowing the image processor 100 to perform a drawing process for generating image data to be displayed on the display device DISP0 alone and writes the generated command sequence to the command write buffer in the image processor 100 in the loading frame (see bottom-axis portions of FIGS. 2 and 3).

In this case, the host CPU 200 allows the image processor 100 to perform only the drawing process for generating image data to be displayed on the display device DISP0 for the following reasons. Both the first and second determination results are negative in the case where long frames are switched in the front half period of the loading frame and the period of one long frame that starts from the switching continues at the start point of the drawing frame as illustrated in the bottom-axis portions of FIGS. 2 and 3 or in the case where long frames are switched before the loading frame and the period of one long frame that starts from the switching continues at the start point of the drawing frame although not illustrated. The drawing process for generating image data to be written to the drawing buffer for the display device DISP1 in the period of the long frame that continues at the start point of the drawing frame has already been terminated at the start point of the drawing frame. Accordingly, if the drawing process for generating image data to be displayed on the display device DISP1 in the drawing frame is initiated, drawing processes corresponding to a total of two frames are performed for the single (long) frame that continues at the start point of the drawing frame. Thus, to prevent execution of such excessive drawing processes, the host CPU 200 allows the image processor 100 to perform only the drawing process for generating image data to be displayed on the display device DISP0 when both the first and second determination results are negative.

FIG. 4 is a flow chart illustrating processes of the control program executed by the host CPU 200 to control the image processor 100 as described above. In this embodiment, the host CPU 200 executes the control program once every short frame which is the display period of the display device DISP0. Here, the processes of steps S1 to S3 are executed in the current frame illustrated in FIGS. 2 and 3, and the processes of steps S11 to S18, S21 to S28, and S31 to S34 are executed in the loading frame. In the example shown in FIG. 4, an appropriate procedure to be performed in the loading frame subsequent to the current frame among the procedure of steps S11 to S18, the procedure of steps S21 to S28, and the procedure of S31 to S34 is determined according to the procedure of steps S1 to S3 in the current frame, and the determination result is used in the loading frame which comes one short frame later. The process of each step of the control program is described below.

First, in step S1, the host CPU 200 estimates generation positions of a vertical blanking signal VB1 in the loading frame and in the drawing frame. Then, in step S2, the host CPU 200 performs first determination as to whether or not an estimated generation position of a vertical blanking signal VB1 falls in the front half period of the drawing frame. When the first determination result is yes, the host CPU 200 determines that the processes of steps S11 to S18 are to be performed in the loading frame. On the other hand, when the first determination result of step S2 is no, the host CPU 200 proceeds to step S3 to perform second determination as to whether or not an estimated generation position of a vertical blanking signal VB1 falls in the rear half period of the loading frame. When the second determination result is yes, the host CPU 200 determines that the processes of steps S21 to S28 are to be performed in the loading frame. On the other hand, when both the first and second determination results are no, the host CPU 200 determines that the processes of steps S31 to S34 are to be performed in the loading frame.

Details of the processes performed in the loading frame in each of these cases are separately described below.

(1) In the case where first determination result is yes

First, the host CPU 200 loads a CBA_READ command into the image processor 100 (step S11). As the CBA_READ command is loaded into the image processor 100, the host CPU 200 reads the command buffer flag CBA from the register 104 in the image processor 100. When the read command buffer flag CBA is "0", the host CPU 200 sets the command buffer CB0 as a command write buffer and sets the command buffer CB1 as a command read buffer. When the read command buffer flag CBA is "1", the host CPU 200 sets the command buffer CB1 as a command write buffer and sets the command buffer CB0 as a command read buffer. The host CPU 200 then generates a preceding drawing command instructing the image processor 100 to perform a drawing process for generating image data of one screen to be displayed on the display device DISP0 and writes the drawing command to the command write buffer (step S12).

The host CPU 200 then writes an INT_DRAWEND command to the command write buffer (step S13) and then writes a WAIT_DRAWEND command to the command write buffer (step S14). Here, the INT_DRAWEND command is a command instructing the image processor 100 to transmit a drawing termination interrupt signal to the host CPU 200 when a drawing process instructed by a previous drawing command has been terminated. The WAIT_DRAWEND command is a command instructing the image processor 100 to await execution of a subsequent command until writing of image data of one screen to the drawing buffer is completed after the drawing process instructed by the previous drawing command is terminated.

The host CPU 200 then writes a WAIT_BANKNO command to the command write buffer (step S15). The WAIT_BANKNO command is a command instructing the image processor 100 to wait until a frame buffer specified by the command is switched to a drawing buffer by a bank flip when the frame buffer is not a drawing buffer. The WAIT_BANKNO command loaded in step S15 allows the two frame buffers FB10 and FB11 used for image display of a long frame to be alternately specified.

The host CPU 200 then generates a succeeding drawing command instructing the image processor 100 to perform a drawing process for generating image data of one screen to be displayed on the display device DISP1 and writes the drawing command to the command write buffer (step S16). The host CPU 200 then writes a WAIT_DRAWEND command to the command write buffer (step S17). The host CPU 200 then writes a WAIT_BANKFLIP command to the command write buffer (step S18)

The WAIT_BANKFLIP command is a command instructing the image processor 100 to wait until bank flip is generated for a specified pair of frame buffers. Through the WAIT_BANKNO command loaded in step S18, the pair of frame buffers FB00 and FB01 for the display device DISP0 is specified when the display device DISP0 performs display of a short frame as in this example. The same is true for steps S28 and S34 described later.

(2) In the case where first determination result is no and second determination result is yes First, similar to the above step S11, the host CPU 200 loads a CBA_READ command into the image processor 100 (step S21). The host CPU 200 then generates a preceding drawing command instructing the image processor 100 to perform a drawing process for generating image data of one screen to be displayed on the display device DISP1 and writes the drawing command to the command write buffer (step S22).

The host CPU 200 then writes an INT_DRAWEND command to the command write buffer (step S23) and then writes a WAIT_DRAWEND command to the command write buffer (step S24). The host CPU 200 then writes a WAIT_BANKNO command to the command write buffer (step S25). The WAIT_BANKNO command loaded in step S25 allows the two frame buffers FB00 and FB01 used for image display of a short frame to be alternately specified.

The host CPU 200 then generates a succeeding drawing command instructing the image processor 100 to perform a drawing process for generating image data of one screen to be displayed on the display device DISP0 and writes the drawing command to the command write buffer (step S26). The host CPU 200 then writes a WAIT_DRAWEND command to the command write buffer (step S27). The host CPU 200 then writes a WAIT_BANKFLIP command to the command write buffer (step S28).

(3) In the case where both first and second determination results are no

First, similar to the above step S11, the host CPU 200 loads a CBA_READ command into the image processor 100 (step S31). The host CPU 200 then generates a sole drawing command instructing the image processor 100 to perform a drawing process for generating image data of one screen to be displayed on the display device DISP0 and writes the drawing command to the command write buffer (step S32).

The host CPU 200 then writes a WAIT_DRAWEND command to the command write buffer (step S33). The host CPU 200 then writes a WAIT_BANKFLIP command to the command write buffer (step S34).

Details of the processes of the control program performed by the host CPU 200 have been described above.

FIG. 5 is a timing chart illustrating an example of control of the image processor 100 performed in this embodiment. As shown in FIG. 5, in this example of control, each time short frames are switched, the command buffers CB0 and CB1 are alternately set as a command write buffer under control of the host CPU 200. If the command buffer CB0 (or CB1) is set as a command write buffer and a command is loaded in a kth short frame, the command buffer CB0 (or CB1) is set as a command read buffer and a command is read from the command read buffer to perform a drawing process in a subsequent (k+1)th frame.

As shown in FIG. 5, a vertical blanking signal VB1 indicating the start point of a long frame is generated in the front half of a (short) frame that starts from time t1. Therefore, a drawing process for generating image data to be displayed on the display device DISP0 in a short frame is performed and a drawing process for generating image data to be displayed on the display device DISP1 in a long frame is then performed. Here, a WAIT_BANKNO command is executed after a drawing command instructing a drawing process for generating image data to be displayed on the display device DISP0 (see step S15 in FIG. 4). However, in this example, a frame buffer FB10 is specified as a drawing buffer through the WAIT_BANKNO command. In addition, in this example, during execution of the drawing process for generating the image data to be displayed on the display device DISP0, long frames are switched and bank flip between the frame buffers FB10 and FB11 is performed such that the frame buffer FB10 is set as a drawing buffer and the bank flip enable flag FEXEC1 is reset to "0". Accordingly, in this example, when the drawing process for generating image data to be displayed on the display device DISP0 is terminated, the frame buffer FB10 specified by the WAIT_BANKNO command has already been set as a drawing buffer, and therefore a command subsequent to the WAIT_BANKNO command is immediately executed and a drawing process for generating image data to be displayed on the display device DISP1 is initiated.

A vertical blanking signal VB1 indicating the start point of a long frame is also generated in the front half of a (short) frame that starts from time t2. Therefore, a drawing process for generating image data to be displayed on the display device DISP0 is performed and then a drawing process for generating image data to be displayed on the display device DISP1 is performed. Here, a WAIT_BANKNO command is executed after a drawing command instructing a drawing process for generating image data to be displayed on the display device DISP0 (see step S15 in FIG. 4). However, in this example, a frame buffer FB11 is specified as a drawing buffer through the WAIT_BANKNO command. In addition, in this example, when the drawing process for generating the image data to be displayed on the display device DISP0 is terminated, long frames have not yet been switched and thus bank flip between the frame buffers FB10 and FB11 has also not yet been performed such that the frame buffer FB11 is set as a drawing buffer. Accordingly, in this example, after the drawing process for generating image data to be displayed on the display device DISP0 is terminated, long frames are switched and bank flip between the frame buffers FB10 and FB11 is performed. Then, when the frame buffer FB11 specified by the WAIT_BANKNO command is set as a drawing buffer, a command subsequent to the WAIT_BANKNO command is initiated and a drawing process for generating image data to be displayed on the display device DISP1 is initiated.

A vertical blanking signal VB1 indicating the start point of a long frame is generated in the rear half of a (short) frame that starts from time t3. In addition, a vertical blanking signal VB1 is generated in the front half of a short frame immediately before the short frame. Therefore, a drawing process for generating image data to be displayed on the display device DISP0 is performed in the short frame that starts from time t3.

A vertical blanking signal VB1 indicating the start point of a long frame is generated in the rear half of a (short) frame that starts from time t4. In addition, a vertical blanking signal VB1 is generated in the rear half of a (short) frame immediately before the short frame. Therefore, in the (short) frame starting time t4, a drawing process for generating image data to be displayed on the display device DISP1 is performed and a drawing process for generating image data to be displayed on the display device DISP0 is then performed. Here, a WAIT_BANKNO command is executed after a drawing command instructing a drawing process for generating image data to be displayed on the display device DISP1 (see step S25 in FIG. 4). However, in this example, a frame buffer FB01 is specified as a drawing buffer through the WAIT_BANKNO command. In addition, in this example, the frame buffer FB01 is set as a drawing buffer when a short frame starts at time t4. Accordingly, in this example, when the drawing process for generating image data to be displayed on the display device DISP1 is terminated, the frame buffer FB01 specified by the WAIT_BANKNO command has already been set as a drawing buffer, and therefore a command subsequent to the WAIT_BANKNO command is immediately executed and a drawing process for generating image data to be displayed on the display device DISP0 is initiated.

The host CPU 200 performs switching control of the bank flip enable flags FEXEC0 and FEXEC1 in different manners in the case where it performs a drawing process for the display device DISP0 in synchronization with a short frame and then performs a drawing process for the display device DISP1, in the case where it performs a drawing process for the display device DISP1 in synchronization with a short frame and then performs a drawing process for the display device DISP0, and in the case where it performs only the drawing process for the display device DISP0 in synchronization with a short frame.

First, in the case where the host CPU 200 performs a drawing process for the display device DISP0 precedingly in synchronization with a short frame and then performs a drawing process for the display device DISP1 succeedingly, the host CPU 200 sets both the bank flip enable flags FEXEC0 and FEXEC1 to "1" upon detection of termination of both the drawing processes.

Next, in the case where the host CPU 200 performs a drawing process for the display device DISP1 precedingly in synchronization with a short frame and then performs a drawing process for the display device DISP0 succeedingly, the host CPU 200 sets the bank flip enable flag FEXEC1 to "1" upon detection of termination of the drawing process for the display device DISP1 and then sets the bank flip enable flag FEXEC0 to "1" upon detection of termination of the drawing process for the display device DISP0.

Next, in the case where the host CPU 200 performs only the drawing process for the display device DISP0 in synchronization with a short frame, the host CPU 200 sets the bank flip enable flag FEXEC0 to "1" upon detection of termination of the drawing process for the display device DISP0.

The operation of this embodiment has been described above.

As described above, according to this embodiment, it is possible to display a moving image on each of the two displays DISP0 and DISP1 without causing frame dropping even when frame lengths (i.e., display periods) of the two display devices DISP0 and DISP1 are different. The image processor control method according to this embodiment also has an advantage in that it is applicable to an inexpensive image processor that performs drawing processes for two display devices in parallel using one drawing engine.

Other Embodiments

Although the embodiment of the invention has been described above, the invention may provide various other embodiments. The following are examples.

(1) In the above embodiment, in the case where an estimated generation position of a vertical blanking signal VB1 falls in the front half period of the drawing frame, the host CPU 200 initiates a drawing process for generating image data to be displayed on the display device DISP1, on the condition that bank flip between frame buffers for the display device DISP1 in the drawing frame is completed, after completing a drawing process for generating image data to be displayed on the display device DISP0. In addition, in the above embodiment, in the case where an estimated generation position of a vertical blanking signal VB1 is not present in the front half period of the drawing frame and is present in the rear half period of the loading frame, the host CPU 200 initiates a drawing process for generating image data to be displayed on the display device DISP0, on the condition that bank flip between frame buffers for the display device DISP0 in the drawing frame is completed, after completing a drawing process for generating image data to be displayed on the display device DISP1. However, the host CPU 200 may also perform the following control instead of performing a control operation to initiate a drawing process on the condition of completion of such bank flip. First, in the case where an estimated generation position of a vertical blanking signal VB1 is present in the front half period of the drawing frame and it is obvious that bank flip between frame buffers for the display device DISP1 in the drawing frame is performed in the front half period of the drawing frame, the host CPU 200 initiates a drawing process for generating image data to be displayed on the display device DISP1, when the rear half period of the drawing frame has started, after completing a drawing process for generating image data to be displayed on the display device DISP0. In addition, in the case where an estimated generation position of a vertical blanking signal VB1 is not present in the front half period of the drawing frame and is present in the rear half period of the loading frame, the host CPU 200 initiates a drawing process for generating image data to be displayed on the display device DISP0, when the rear half period of the drawing frame has started, after completing a drawing process for generating image data to be displayed on the display device DISP1. These embodiments have the same advantages as the above embodiment.

(2) In the above embodiment, a reference point which divides a short frame into front and rear half periods is set at the center of the short frame since the ratio between the time required for a drawing process for generating image data to be displayed on the display device DISP0 in a short frame and the time required for a drawing process for generating image data to be displayed on the display device DISP1 in a long frame is 1:1. However, the invention may also be applied when the ratio between the time required for a drawing process for generating image data to be displayed on the display device DISP0 in a short frame and the time required for a drawing process for generating image data to be displayed on the display device DISP1 in a long frame is a:b rather than 1:1. In this case, a point which divides a short frame into a front sub period and a rear sub period at a ratio of a:b is set as a reference point and the host CPU 200 may perform the same determinations as the above embodiment based on positional relationships between the reference point and estimated generation positions of vertical blanking signals VB1. Namely, the reference point is set such that a ratio of the front sub period to the rear sub period corresponds to a ratio of a time required for generation of an image to be displayed on the first display device to a time required for generation of an image to be displayed on the second display device.

(3) A counter that counts clocks of a predetermined frequency and is reset at the start point of a short frame may be provided and the host CPU 200 may correct an estimated generation position of a vertical blanking signal VB1 based on the value of the counter at the time when the vertical blanking signal VB1 is generated and may then estimate a generation position of a subsequent vertical blanking signal VB1 based on the corrected estimated generation position.

(4) In the above embodiment, a short frame immediately before a drawing frame is set as a loading frame. However, when delay of initiation of a drawing process based on a drawing command after the drawing command is loaded is longer than one short frame, a short frame prior to a short frame immediately before a drawing frame may be set as a loading frame. In this case, the host CPU 200 obtains estimated generation positions of vertical blanking signals in a drawing frame and a short frame immediately before the drawing frame, which is not a loading frame, and determines the types and the order of drawing processes performed in the drawing frame based on the obtained estimated generation positions.

(5) A control program, which divides, when a sequence of drawing commands for a display device that performs a display operation in a short frame and a sequence of drawing commands for a display device that performs a display operation in a long frame are provided, each of the drawing command sequences into 1-screen drawing units and provides commands of each of the drawing units to the image processor while inserting required control commands such as WAIT_BANKNO commands between the commands of each drawing unit according to the procedure shown in FIG. 4, may be produced and may then be distributed to manufacturers of amusement apparatuses or the like using the image processor 100. The control program may be stored and distributed on a computer-readable recording medium such as a CD-ROM and may also be distributed over a network such as the Internet.

According to the invention, when both the first determination and the second determination are negative, only a drawing command instructing generation of an image to be displayed on the first display device is provided to the image processor in the command loading process. Therefore, it is possible to prevent a drawing command for the second display device from being executed twice or more in one long frame (second frame), ensuring that a drawing command for only one frame is executed in one second frame. In addition, when the first determination is affirmative, a preceding drawing command instructing generation of an image to be displayed on the first display device and a succeeding drawing command instructing generation of an image to be displayed on the second display device are sequentially provided to the image processor. Therefore, it is possible to allow the image processor to initiate generation of an image to be displayed on the second display device in a period other than a front sub period of the drawing frame (later one of the two first frames in the 2-frame period) in which second frames are switched, and it is also possible to perform both generation of image data for the first display device and generation of image data for the second display device within the later first frame. Further, when the first determination is negative and the second determination is affirmative, the point of switching of second frames is not present in the front sub period of the later first frame. Accordingly, in this case, by sequentially providing a preceding drawing command instructing generation of an image to be displayed on the second display device and a succeeding drawing command instructing generation of an image to be displayed on the first display device to the image processor, it is possible to allow the image processor to complete, in the later first frame, generation of image data to be displayed on the second display device before switching of second frames and to complete generation of image data to be displayed on the first display device using a period remaining after completion of the generation of the image data to be displayed on the second display device. Thus, it is possible to allow the image processor to display images on the first and second display devices having different frame lengths without causing frame dropping. Japanese Patent No. 3630587 relates to an apparatus that simultaneously displays images on two sub-screen in parallel. However, the apparatus described in Japanese Patent No. 3630587 cannot allow one image processor to display images on two display devices having different frame lengths without causing frame dropping as in the invention.

The invention claimed is:

1. A method for controlling an image processor to perform display of an image on a first display device in synchronization with first frames and to perform display of an image on a second display device in synchronization with second frames each of which has a time length longer than a time length of each first frame, the method comprising:
   a synchronization signal acquisition process of acquiring a first synchronization signal synchronized with switching of the first frames; and
   an estimation process of estimating, each time the first synchronization signal is acquired, a generation position of a second synchronization signal synchronized with switching of the second frames within a 2-frame period corresponding to two first frames after the first synchronization signal is acquired, wherein
   the image processor is provided with a drawing command instructing generation of an image to be displayed on the first display device or the second display device controllably in accordance with results of the estimating by the estimation process.

2. The method according to claim 1, wherein the image processor is provided with the drawing command in accordance with the estimated generation position of the second synchronization signal within the 2-frame period.

3. The method according to claim 2, wherein a reference point is set in each of earlier one and later one of the two first frames in the 2-frame period so as to divide each of the earlier first frame and the later first frame into a front sub period and a rear sub period, the method further comprising a command loading process including:
   performing first determination as to whether or not the estimated generation position of the second synchronization signal falls in the front sub period of the later first frame, and sequentially providing a preceding drawing command instructing generation of an image to be displayed on the first display device and a succeeding drawing command instructing generation of an image to be displayed on the second display device to the image processor when the first determination is affirmative;
   performing second determination as to whether or not the estimated generation position of the second synchronization signal falls in the rear sub period of the earlier first frame when the first determination is not affirmative, and sequentially providing a preceding drawing command instructing generation of an image to be displayed on the second display device and a succeeding drawing command instructing generation of an image to be displayed on the first display device to the image processor when the second determination is affirmative; and
   providing a sole drawing command instructing generation of the image to be displayed on the first display device to the image processor when the first determination is not affirmative and the second determination is not affirmative.

4. The method according to claim 3, wherein the image processor further comprising:
   a first frame buffer and a second frame buffer, each storing an image to be displayed on the first display device, wherein one of the first and second frame buffers is in a display state in which data of the image is provided from the frame buffer to the first display device while the other is in a drawing state in which data of the image is written to the frame buffer and the first and second frame buffers perform bank flip to switch one of the first and second frame buffers from a drawing state to a display state and to switch the other from a display state to a drawing state in synchronization with each first frame; and
   a third frame buffer and a fourth frame buffer, each storing an image to be displayed on the second display device, wherein one of the third and fourth frame buffers is in a display state in which data of the image is provided from the frame buffer to the second display device while the other is in a drawing state in which data of the image is written to the frame buffer and the third and fourth frame buffers perform bank flip to switch one of the third and fourth frame buffers from a drawing state to a display state and to switch the other from a display state to a drawing state in synchronization with each second frame, and wherein
   the command loading process includes:
   providing, when the first determination is affirmative, the image processor with a command sequence including a bank flip wait command instructing the image processor to await execution of a subsequent command until bank flip between the third and fourth frame buffers is generated, the bank flip wait command being inserted between the preceding drawing command instructing generation of an image to be displayed on the first display device and the succeeding drawing command instructing generation of an image to be displayed on the second display device; and
   providing, when the first determination is not affirmative and the second determination is affirmative, the image processor with a command sequence including a bank flip wait command instructing the image processor to await execution of a subsequent command until bank flip between the first and second frame buffers is generated, the bank flip wait command being inserted between the preceding drawing command instructing generation of an image to be displayed on the second display device and the succeeding drawing command instructing generation of an image to be displayed on the first display device.

5. The method according to claim 3, wherein the reference point is set such that a ratio of the front sub period to the rear sub period corresponds to a ratio of a time required for generation of an image to be displayed on the first display device to a time required for generation of an image to be displayed on the second display device.

6. A non-transitory machine readable storage medium for use in a computer, the medium containing a program executable by the computer to perform a method for controlling an image processor to perform display of an image on a first display device in synchronization with first frames and to perform display of an image on a second display device in synchronization with second frames each of which has a time length longer than a time length of each first frame, wherein the method comprises:
 a synchronization signal acquisition process of acquiring a first synchronization signal synchronized with switching of the first frames; and
 an estimation process of estimating, each time the first synchronization signal is acquired, a generation position of a second synchronization signal synchronized with switching of the second frames within a 2-frame period corresponding to two first frames after the first synchronization signal is acquired, wherein
 the method provides the image processor with a drawing command instructing generation of an image to be displayed on the first display device or the second display device controllably in accordance with results of the estimating by the estimation process.

7. The non-transitory machine readable storage medium according to claim 6, wherein the method provides the image processor with the drawing command in accordance with the estimated generation position of the second synchronization signal within the 2-frame period.

8. The non-transitory machine readable storage medium according to claim 7, wherein a reference point is set in each of earlier one and later one of the two first frames in the 2-frame period so as to divide each of the earlier first frame and the later first frame into a front sub period and a rear sub period, the method further comprising a command loading process including:
 performing first determination as to whether or not the estimated generation position of the second synchronization signal falls in the front sub period of the later first frame, and sequentially providing a preceding drawing command instructing generation of an image to be displayed on the first display device and a succeeding drawing command instructing generation of an image to be displayed on the second display device to the image processor when the first determination is affirmative;
 performing second determination as to whether or not the estimated generation position of the second synchronization signal falls in the rear sub period of the earlier first frame when the first determination is not affirmative, and sequentially providing a preceding drawing command instructing generation of an image to be displayed on the second display device and a succeeding drawing command instructing generation of an image to be displayed on the first display device to the image processor when the second determination is affirmative; and
 providing a sole drawing command instructing generation of the image to be displayed on the first display device to the image processor when the first determination is not affirmative and the second determination is not affirmative.

9. The non-transitory machine readable storage medium according to claim 8, wherein the reference point is set such that a ratio of the front sub period to the rear sub period corresponds to a ratio of a time required for generation of an image to be displayed on the first display device to a time required for generation of an image to be displayed on the second display device.

10. A computer connected to an image processor that performs display of an image on a first display device in synchronization with first frames and performs display of an image on a second display device in synchronization with second frames each of which has a time length longer than a time length of each first frame, the computer controlling the image processor to ensure parallel displaying of the images on the first display device and the second display device, the computer comprising:
 a synchronization signal acquisition module of acquiring a first synchronization signal synchronized with switching of the first frames: and
 an estimation module of estimating, each time the first synchronization signal is acquired, a generation position of a second synchronization signal synchronized with switching of the second frames within a 2-frame period corresponding to two first frames after the first synchronization signal is acquired, wherein
 the computer provides the image processor with a drawing command instructing generation of an image to be displayed on the first display device or the second display device controllably in accordance with results of the estimating by the estimation module.

* * * * *